United States Patent [19]

Sensi

[11] 4,243,402
[45] Jan. 6, 1981

[54] APPARATUS FOR MEASURING TEMPERATURES IN MOLTEN METAL

[75] Inventor: John E. Sensi, Arnold, Pa.

[73] Assignee: PPG Industries, Inc., Pittsburgh, Pa.

[21] Appl. No.: 941,879

[22] Filed: Sep. 13, 1978

[51] Int. Cl.² .................... H01L 35/02; C03B 18/02
[52] U.S. Cl. ........................... 65/29; 65/182.1;
   73/343 R; 136/232; 136/242; 136/234
[58] Field of Search ............ 65/182 R; 136/242, 232,
   136/233, 234; 73/343 R

[56] References Cited

U.S. PATENT DOCUMENTS

| | | | |
|---|---|---|---|
| 2,019,695 | 11/1935 | Ross | 136/242 |
| 3,329,766 | 7/1967 | Cole | 174/116 |
| 3,374,122 | 3/1968 | Cole | 136/234 |
| 3,816,183 | 6/1974 | Kraus | 136/234 |
| 3,930,829 | 1/1976 | Sensi | 65/65 |
| 4,070,911 | 1/1978 | Makin | 73/343 R |
| 4,099,952 | 7/1978 | Schwenninger | 65/182 R |
| 4,135,538 | 1/1979 | Kurita | 136/234 |

*Primary Examiner*—Leland A. Sebastian
*Attorney, Agent, or Firm*—Dennis G. Millman; Paul A. Leipold

[57] ABSTRACT

The invention comprises a temperature sensing device comprising a thermocouple which is protected by a woven cloth. The cloth is impervious to wetting or transmission of the molten material whose temperature is to be measured. A thermocouple further is surrounded by weights of greater density than the molten metal in order to hold the thermocouple below the surface of the molten metal.

23 Claims, 5 Drawing Figures

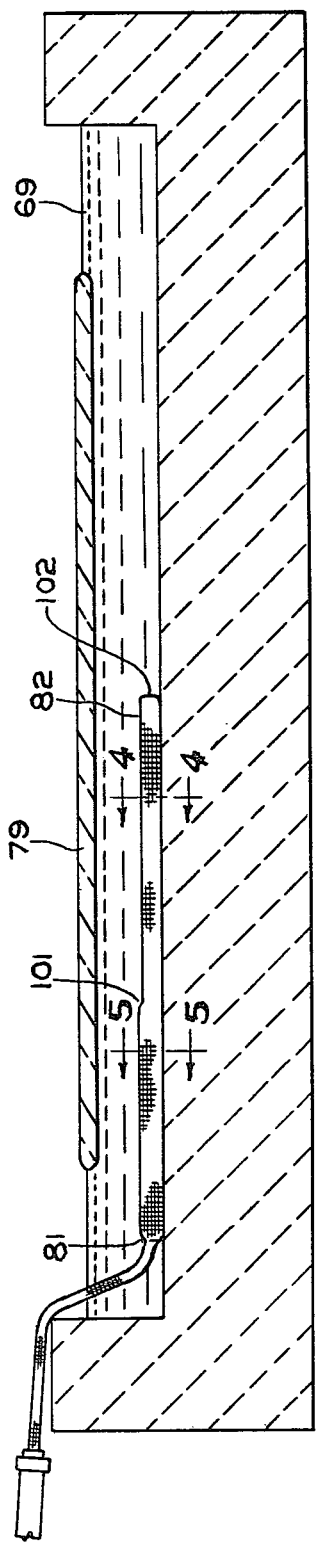
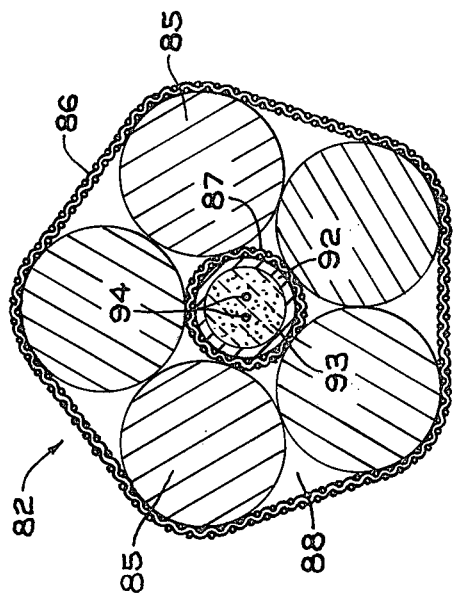
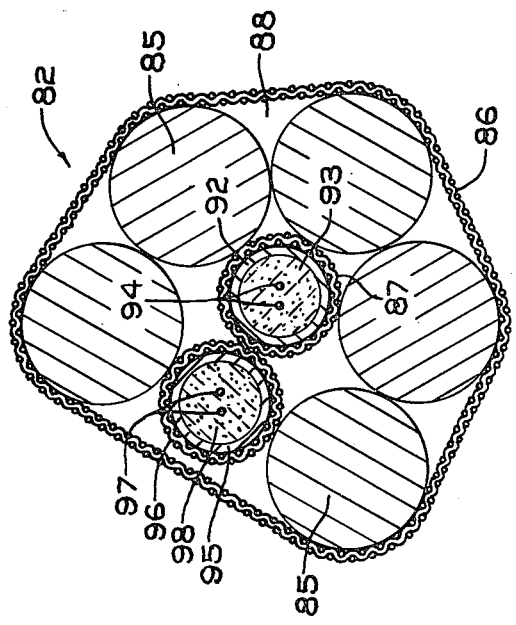

APPARATUS FOR MEASURING TEMPERATURES IN MOLTEN METAL

BACKGROUND OF THE INVENTION

1. Field of the Invention

This invention generally relates to temperature measurement in molten metals. The apparatus of the invention is particularly suitable for measurement of temperatures in the float forming chamber for forming flat glass.

2. Discussion of the Prior Art

The following references are considered pertinent to the invention in this application.

U.S. Pat. No. 3,816,183 to Krause discloses a temperature measuring device for repeated immersion in molten metal. The immersion end includes a vacuum cast sleeve of refractory fibers.

U.S. Pat. No. 3,329,766 to Cole discloses an expendable immersion thermocouple for measuring the temperature of molten metal. The thermocouple of Cole is designed for utilization in a steel bath of about 2,900° F. The thermocouple is designed to survive the elevated temperatures for a time sufficient to made a temperature measurement. It is not designed for a long life.

U.S. Pat. No. 3,374,122 to Cole discloses an expendable immersion thermocouple including a weight. The thermocouple of Cole is designed to be weighted sufficient to drop through the slag at the top of a steel furnace without damage to the thermocouple during passage through the slag.

U.S. Pat. No. 2,019,695 to Ross discloses a thermocouple for temperature measurement in a bath of molten metal comprising a thermocouple protected by a carbon member and wrapped with an asbestos coating which has been impregnated with sodium silicate.

In the processes of float glass formation wherein molten glass is fomed into sheets on a pool of molten metal there has been a continuing interest in monitoring the temperature of the molten metal. Temperature variations of the molten metal at various longitudinal and transverse locations on the bath can affect the uniformity of the glass formed as portions of the glass resting on hotter tin will have lower viscosity and stretch by a greater amount than those which are resting on cooler portions of tin. It has been proposed that thermocouples be embedded in refractories forming the bottom of the float forming chamber. However, this has not been successfully accomplished. As for reasons not entirely clear, such thermocouples have been operable for only short periods of up to several months. In contrast the forming chamber bottoms themselves are utilized for periods of seven years or longer without reconstruction. Therefore, once the thermocouples embedded in the bottom of the bath become inoperable, they cannot be replaced. It is theorized that the thermocouples embedded in the refractory bottom of the bath fail due to any of the following factors or combinations of them: shifting of the bath refractories as they expand during heat up of the bath leading to physical fracture of the thermocouple, attack by hydrogen migrating through the bottom or attack by tin migrating through the bottom refractories.

It has also been proposed that thermocouples be inserted in the tin under the glass. However, thermocouples inserted in the tin have had a short life as the tin itself and the hydrogen forming the bath atmosphere and dissolved in the tin comprise a very corrosive environment leading to quick failure of the thermocouples.

It is not practical to insert and then withdraw thermocouples to obtain readings under the glass in the tin bath as such insertion and withdrawal may set up undesirable flows in the tin and further the flows caused by insertion lead to inaccurate readings.

There remains a continuing need for a temperature sensing device which may be utilized to sense the temperature of the tin bath in the areas below the floating glass. There is a need for a device that will provide continuous monitoring of the tin bath to determine the effect of changes in throughput of the glass through the forming chamber or in the temperature of the glass delivered to the forming chamber. Further, there is a need to determine the effect on the tin bath of the movement of the tin by linear motors, effect of dams or barriers within the bath and the effect on tin temperature of overhead cooling or heating of the glass in the bath. The only temperatures currently available on a continuous basis are edge temperatures which are obtained by graphite protected rigid thermocouples in the edges of the bath, not in the area where the glass is located.

SUMMARY OF THE INVENTION

It is an object of this invention to overcome the disadvantages of the prior art.

It is another object of this invention to produce flat glass of even thickness contour.

It is an additional object of this invention to form glass of good optical quality laterally and longitudinally.

It is a further object of this invention to provide long term temperature monitoring in molten metal.

It is another additional object of this invention to provide a temperature sensing device resistant to attack by molten tin.

It is a further additional object of this invention to allow regulation of tin bath temperatures.

It is another further additional object of this invention to provide a thermocouple which may be inserted in a glass float forming chamber during the operation of the forming chamber.

It is another object of this invention to provide a temperature sensing device of long life in molten metal.

These and other objects of the invention are generally accomplished by providing a temperature sensing device comprising a thermocouple which is protected by a woven cloth. The cloth is imprevious to wetting or transmission of the molten material whose temperature is to be measured. A thermocouple further is surrounded by weights of greater density than the molten metal in order to hold the thermocouple below the surface of the molten metal.

In a best mode the invention comprises two chromel-alumel thermocouples each surrounded by Inconel alloy 600 sheaths. The Inconel sheaths are in turn covered by a braided ceramic fiber sleeve. A bundle of the braid covered thermocouple and four tungsten rods of about 5 mm. diameter are in turn covered with woven braided ceramic fiber sleeving. The temperature sensing device is made of a length, such as about 150 inches (about 381 cm.), which is sufficient to reach from an edge to the middle of the bath in a typical forming chamber for formation of float glass.

BRIEF DESCRIPTION OF THE DRAWINGS

FIG. 3 is a partial sectional elevation view along section line 3—3 of FIG. 1 illustrating the location of a thermocouple of the invention.

FIG. 4 is a sectional view of the thermocouple seen in FIG. 3 taken along the section line 4—4 of FIG. 3.

FIG. 5 is a sectional view of the thermocouple of the invention taken along the section line 5—5 of FIG. 3.

DESCRIPTION OF THE PREFERRED EMBODIMENTS

There are numerous advantages achieved by the utilization of the instant thermocouple. The thermocouple has been found to have a long life of up to about six months. Further, the thermocouple may be easily inserted through the side seals of the forming chamber so that structural changes to the forming chamber are not necessary. The thermocouple of the invention further may be easily replaced when it does become inoperative. The cost of the thermocouple is low as the tungsten rod may be easily reused when a new theremocouple is inserted. Further, it is possible using the apparatus system of the invention to have more than one thermocouple in the apparatus to measure temperatures at different locations of the bath. Another advantage of the invention is that continuous reading thermocouples in the bath allow early warning of the changes in temperature of the bath which may lead to glass defects. An advantage of the instant apparatus is that the tungsten rods provide sufficient rigidity so that the thermocouple may be inserted under the glass to the center of the tank without special equipment. Another advantage of the instant thermocouple is that it is flexible enough that it may be inserted in existing forming chambers without modification. In order to more fully describe the invention a brief description of the operation of a float forming process will be provided in the description of FIGS. 1 and 2 below.

Figure 1:
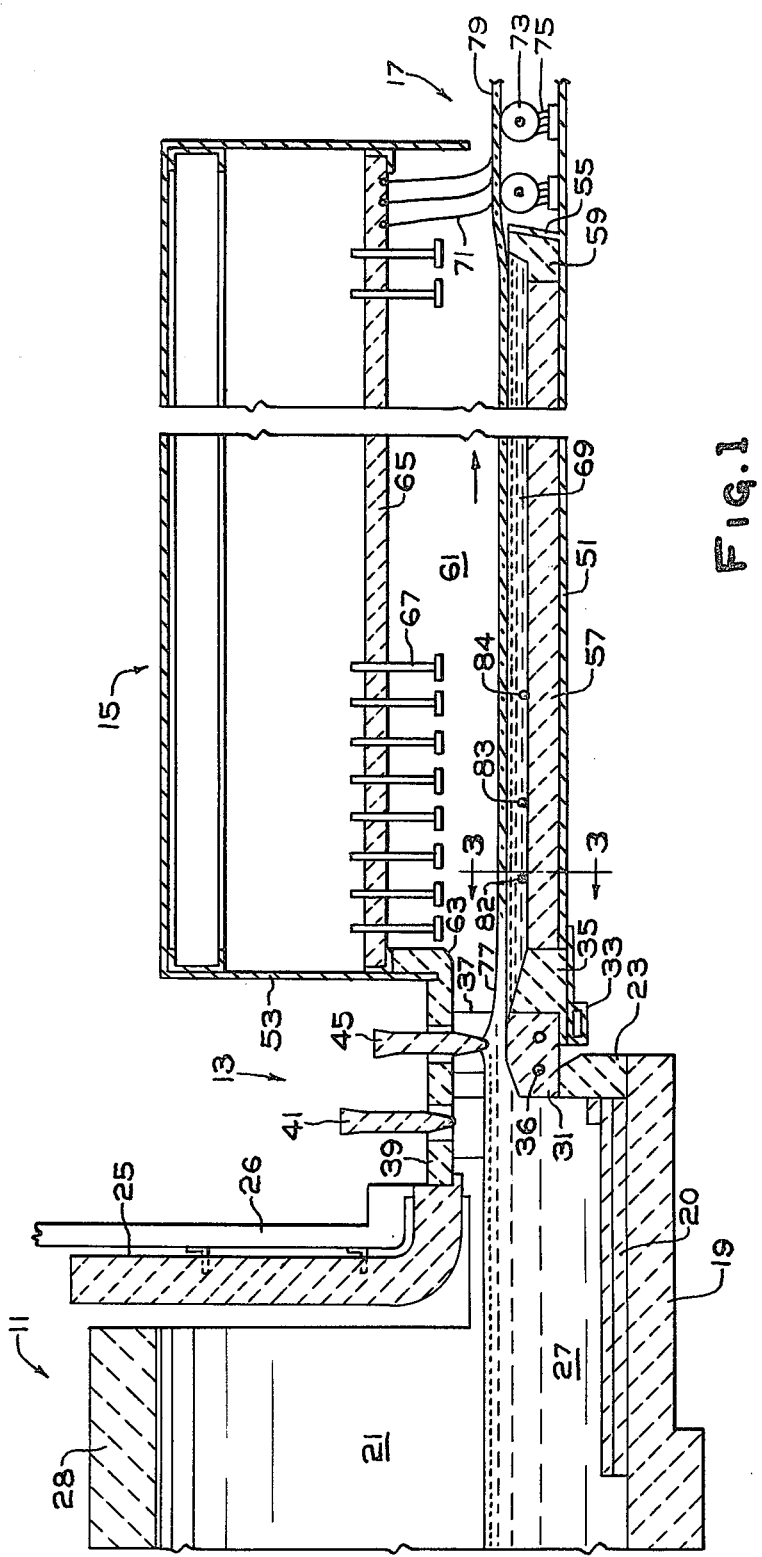
FIG. 1 is a sectional elevation view of an apparatus for producing flat glass in accordance with this invention.
Figure 2:
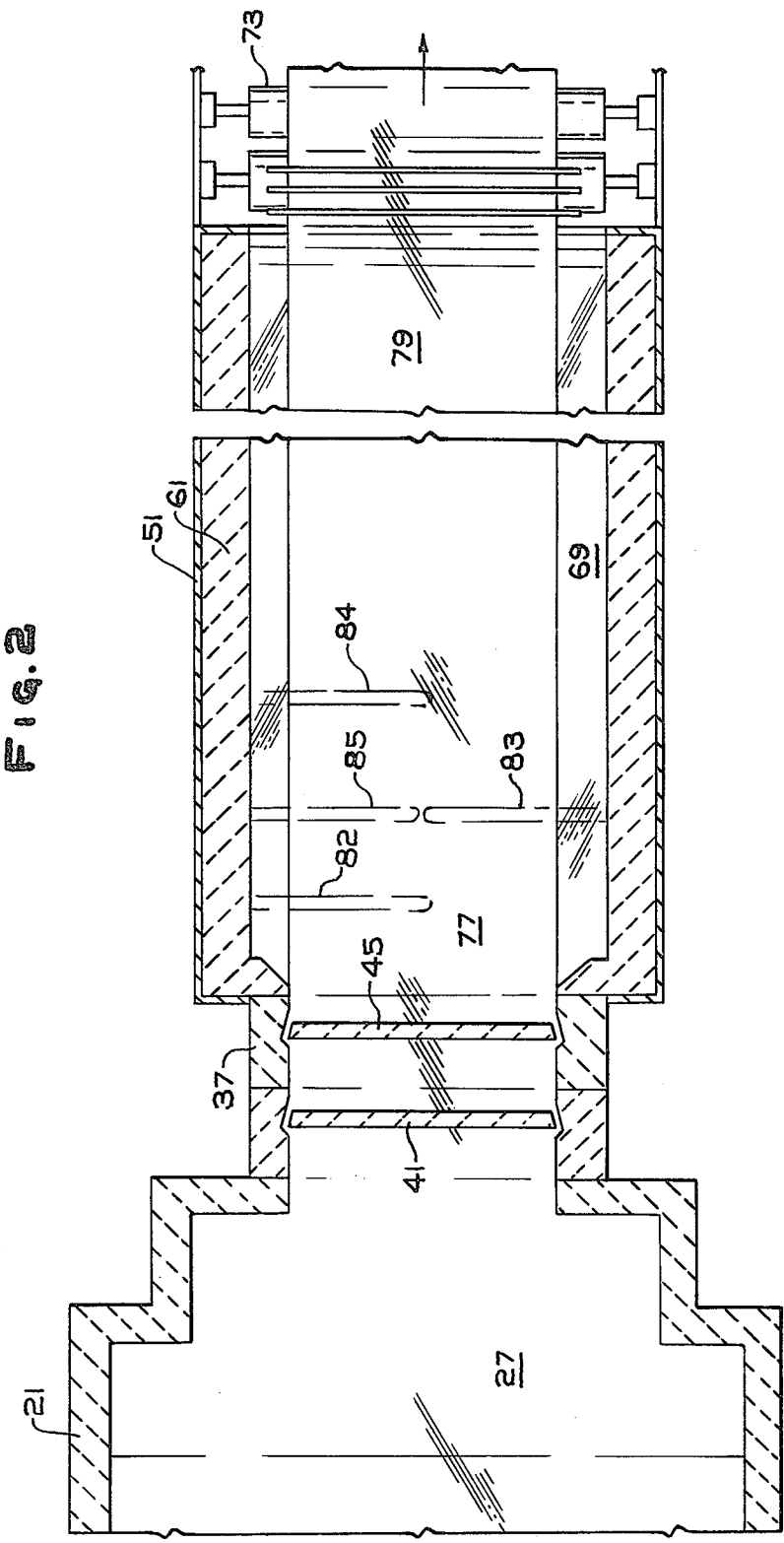
FIG. 2 is a sectional plan view of the apparatus shown in FIG. 1.

Referring now to FIGS. 1 and 2 there is shown a view of a suitable apparatus for carrying out the present invention. The glassmaking apparatus comprises a furnace 11, delivery means 13, a forming chamber 15 and a galss removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 20, side walls and a front basin wall 23. The furnace further comprises an upper front wall 25 which preferably is suspended or supported from above by a structural support 26 and a roof 28 overlying the upper portion of the furnace. A pool of molten galss 27 is maintained in the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like thorugh the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporter embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, define an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably a refractory bottom that has been cast in place inside the bottom casing 51 between the inlet bottom 35 and an exit lip 59 mounted or cast against the lip casing 55. Preferably embedded within the bottom refractory 57 are pipes, not shown, for temperature regulation.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally, the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15 includes a top casing end wall which may extend over the glass removal or withdrawal facility 17 at the downstream end of the forming chamber 15. Alternatively, a separate hood may be provided over the glass removal facility 17. Disposed within the bottom container portion of the forming chamber is a pool of molten metal 69, preferably molten tin or an alloy of tin.

At the downstream end of the forming chamber is the glass removal facility 17 for withdrawing a continuous sheet of glass from the forming chamber 15. The glass removal facility includes curtains 71 or other barriers or seals to segregate the headspace of the forming chamber from the outside environment. These are preferably flexible curtains of heat resistant cloth. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber). The applicant recognizes that the term "bath" has at times been used in the art to mean the pool of molten metal upon which the glass is formed and at other times to mean the forming chamber where the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber. The directions "upstream" and "downstream" are defined by the direction of glass flow through the process; that is, glass flows from an upstream portion of the glassmaking apparatus toward a downstream portion of the glassmaking apparatus.

Extending into the forming chamber 15 from sidewall 61 are illustrated three of the temperature sensing devices of the instant invention 82, 83, 84 and 85. As illustrated in FIG. 3, the device of the instant invention comprises a device which rests on the bottom of the forming chamber 15. The device as illustrated in FIG. 3 has two thermocouples for measurement of temperatures at two points 101 and 102.

As illustrated in FIGS. 3, 4, and 5 the device of the invention comprises two thermocouple elements. One of the thermocouple elements extending only about half the length of the device while the other thermocouple element extends to the end for measurement at point 102. The device extending only partway to the end has its hot junction located to measure a temperature at 101. The location of the hot junction determines the temperature measurement point of the thermocouple. The arrangement of thermocouples such as 85 and 83 allows the measurement of a temperature profile transverse of the molten metal bath when each of the temperature sensing devices 85 and 83 contains at least two temperature sensing thermocouple elements. The cross-section of FIG. 4 shows a preferred construction for a device of the invention utilizing one temperature sensing element. The temperature sensing device comprises a thermocouple 94 preferably of chromel-alumel surrounded by an inorganic filler material 93 such as magnesium oxide. This is sheathed in a durable corrosion resisting metal 92. The thermocouple containing element is then sheathed in a woven refractory cloth 87. In order to provide weight so that the temperature sensing device will sink below the tin surface, high density weights 85 are bundled with the thermocouple containing element. The bundle of sensing elements and weights are held together with non-corrosive high temperature wire such as nichrome wire. The bundle is surrounded by the woven fabric 82.

In FIG. 5 is illustrated a device of the invention containing a second thermocouple element having temperature sensing wires 97 filler 98, corrosion resistant metal 95 and woven sheathing material 96. The temperature sensing device containing both thermocouple elements is then sheathed in woven fabric 86. If desired, a cement material may be utilized in the interstices 88 between the weighting rods 85, the thermocouple elements and the cloth 86.

The cloth 96, 87, and 86 which protects the device of the instant invention from attack by the molten metal may comprise any high temperature woven material which is impervious to the passage of the molten material and is not corrosively attacked by the molten material. The term woven material as used herein includes all types of cloth or fabric having systematically interlaced fibers including, but not limited to, braided materials knitted materials and loom woven material. Felted and pressed fibrous products are not included. In the instance of the molten tin which is the conventional metal in float glass baths the surface tension prevents its passage through a woven ceramic cloth. Woven ceramic cloth also is not rapidly attacked by corrosive elements in the forming chamber. Typical of woven material suitable for the instant invention are cloths formed of ceramic fibers such as fiber glass, ceramic fibers, graphite fibers, carbon fibers, quartz fibers or woven mixtures of these materials. The particular woven fiber to be utilized in each instance is dependent on the temperature at which it is to be utilized and the liquid environment in which it is placed. With some liquids woven cloth of metal or carbon fibers may have less permeability or better corrosion resistance than ceramic fibers. A preferred material in the molten tin bath has been found to be material woven from a alumina-thoria-silica fiber. Such a fiber is commercially available as 3M-AB312 from 3M Co. of St. Paul, Minnesota. Other suitable fibers are ceramic fibers such as quartz, fiber glass E and fiber glass S. For ease of formation for the temperature measuring device of the instant invention it is preferred that the woven material be a braided cloth sleeve so that the thermocouple element and weight rods may be easily held together into the smallest area possible. Further this eliminates any joints which need to be sealed if a wrapping cloth was used. The end of the sleeve is securely tied with a cord formed of the same fiber as the woven material. The braided sleeving material behaves in the manner of a chinese handcuff in that when it is shortened longitudinally the diameter increases for insertion of the thermocouple and weight rods which are then snugly held when the sheathing is longitudinally extended around them. Of course with proper sealing of joints woven fabric material could be utilized in other forms than sheathing. The tightness of weave is dependent on the surface tension and wetting properties of the particular liquid in which the temperature sensing element is utilized.

The material used in weighting the temperature sensing device of the invention may be any heavy stable material. The preferred materials are available in the form of rods and are flexible such that they may be easily flexed for insertion through the side seal and beneath the tin bath. A non-flexible metal may be utilized but insertion in the forming chamber would be more difficult. Metal in forms othen then rods, such as beads, would be utilized but again insertion in a forming chamber would be difficult. Among typical materials that are relatively neutral in the bath chamber are tantalum and rhenium. A preferred material for use in a forming chamber is tungsten as it is available in the form of thin rods, it is flexible, it has a specific gravity much greater than 10, it does not contaminate the glass or tin and it is not corroded by the bath atmosphere.

The thermocouple elements utilized in this invention are commercially available. A preferred wire for the thermocouple element is chromel-alumel. However, platinum-rhodium or other thermocouple wires having the proper temperature sensing capabilities are suitable. The thermocouple elements are generally formed with a filler of ceramic grain such as magnesium oxide between the wire and the metal sheathing of the thermocouple. Metal sheathing of high nickel alloy such as Inconel alloy 600 which is an alloy of parts by weight of 76 percent nickel, 0.04 percent carbon, 0.2 percent manganese, 7.2 percent iron, 0.007 percent sulphur, 0.2 percent silica, 0.1 percent copper and 15.8 percent chromium is preferred for forming chamber use. Other members of this group are suitable. The thermocouples having metal sheathing such as utilized in the invention are commercially available and their structure is not urged as novel.

As illustrated in the drawings it is desired that the thermocouple elements be sheathed in the woven fiber as well as having woven fiber sheathing around the package of the thermocouple and weighting material. This provides double protection to the thermocouples from corrosion by the tin and can prolong the life of the thermocouple even after the outer sheath is punctured or abraded.

If desired ceramic cement material may be inserted in the interstices 88 between the thermocouple elements and the weighting rods 85. The cement material also provides additional protection in the event that the exterior sheath is holed by corrosion or abrasion. However, the ceramic material generally cannot be formed as a monolith since the temperature sensing element generally is flexed while it is inserted into the forming chamber underneath the glass. Therefore, the ceramic material would crack and provide channels for any tin entering the element and has not been found in instances where flexing must occur to be capable of appreciably extending the life of the thermocouple. Cement may be utilized for purposes not requiring flexibility of the temperature sensing apparatus. Among suitable cements are the alumina and alumina magnesium refractory cements. The cements also may be coated on the exterior sheathing to improve abrasion resistance and extend the life of the sheathing.

The devices for recording the temperature measurements from conventional thermocouples and providing readouts of these devices are well known in the art and will not be described in the specification. The devices may be attached to the thermocouple immediately afer it exits from the side seal of the bath where temperatures are low enough to not interfere with the operation. Further the bath atmosphere does not extend beyond the sides seal and corrosion is not a problem there. It is also within the invention to connect thermocouples in the device in series to measure average temperatures or to use thermocouples with more than one hot junction.

Although this invention has been described with reference to particular preferred embodiments, those skilled in the art of glass making and temperature measurement will recognize that variations may be made in the practice of this invention without departing from the concepts disclosed here. For instance the temperature sensing device could be arranged such that the weight rods were utilized to lift the thermocouple up from the floor of the forming chamber to measure temperatures closer to the bottom of the glass. Further, while the temperature sensing device of the invention is illustrated with two thermocouple elements it is within the invention to utilize only one thermocouple element or to have more than two in a temperature sensing device. Another variation of the invention would be to protrude one thermocouple element with its outer woven sheathing up out of the surface woven sheathing to measure temperatures away from the bottom of the bath.

Further while the invention has been described with reference to its utilization in the forming chamber; the concept also would find suitability in other areas such as the measurement of temperatures in hot metals other than tin such as aluminum, mercury or lead. Further the device of the invention could be utilized in measurement of temperatures in non-metallic liquids such as chemicals, detergents, plastics or foods when sheathed with woven fabrics that are not previous to these liquids. It is anticipated that such fabrics may be formed of polymeric materials, metals, glass, carbon or ceramics to achieve desired corrosion resistance in differing hot or corrosive environments.

Accordingly this disclosure is intended to be illustrative rather than limiting and the applicants have defined their invention in the claims accompanying this disclosure.

I claim:

1. Apparatus for measuring temperatures below the surface of liquids comprising temperature sensing means, high density weighting means and woven material impervious to said liquid surrounding said temperature sensing means and said weighting means with the proviso that said woven material comprises a fabric having fibers of a material selected from the group consisting of ceramic fibers, carbon fibers, metal fibers and mixtures thereof.

2. The apparatus of claim 1 wherein said temperature sensing means comprises a thermocouple.

3. The apparatus of claim 1 wherein said temperature sensing means comprises a thermocouple in a protective metal tube.

4. The apparatus of claim 1 or 3 wherein said temperature sensing means is individually surrounded by additional woven material.

5. The apparatus of claim 1 or 3 wherein the weighting means comprises long tungsten rods.

6. The apparatus of claim 1 wherein said temperature sensing means comprises more than one thermocouple.

7. The apparatus of claim 1 wherein said woven material comprises ceramic fibers.

8. The apparatus of claim 1 or 7 wherein said woven material is braided sleeving.

9. The apparatus of claim 5 wherein interstices between said weighting means and said woven material are filled with cement.

10. The apparatus of claim 1 wherein said woven material is coated with cement.

11. A method of temperature measurement in the molten metal bath of a forming chamber comprising inserting a weighted, flexible, woven fabric covered temperature sensing device in said molten metal under the glass in said forming chamber, wherein said fabric is impervious to said molten metal, and reading the temperature of said molten metal from said temperature sensing device.

12. The method of claim 11 wherein the said molten metal is tin and the weighting comprises tungsten.

13. The method of claim 11 wherein said woven fabric comprises ceramic fibers.

14. The method of claim 11 wherein said woven fabric is braided sleeving.

15. The method of claim 11 or 13 wherein said temperature sensing device comprises metal sleeved thermocouple covered with woven fabric and bundled with tungsten rods.

16. In a flat glass-forming chamber including an enclosed chamber containing a pool of glass-supporting molten metal, means for delivering molten glass onto the pool of molten metal at an inlet end, means for removing a continuous sheet of glass from the pool of molten metal and from the chamber at an outlet end, means for advancing glass along the surface of the molten metal from the inlet end to the outlet end of the chamber while forming it into a continuous sheet of desired width and thickness, wherein there is provided in said pool of molten metal at least one apparatus for measuring temperatures below the surface of said molten metal comprising temperature sensing means, high density weighting means and woven material impervious to said molten metal surrounding said temperature sensing means and said weighting means.

17. The chamber of claim 16 wherein said temperature sensing means comprises a thermocouple.

18. The chamber of claim 16 wherein said temperature sensing means comprises a thermocouple in a protective metal tube.

19. The chamber of claim 18 wherein said protective metal tube is individually surrounded by additional woven material.

20. The chamber of claim 16 or 18 wherein the weighting means comprises long tungsten rods.

21. The chamber of claim 16 wherein said temperature sensing means comprises more than one thermocouple.

22. The chamber of claim 16 wherein said woven material comprises braided sleeving of ceramic fibers.

23. The chamber of claim 19 wherein said woven material around said metal tube is impervious to said molten metal.

* * * * *